Figure 1:
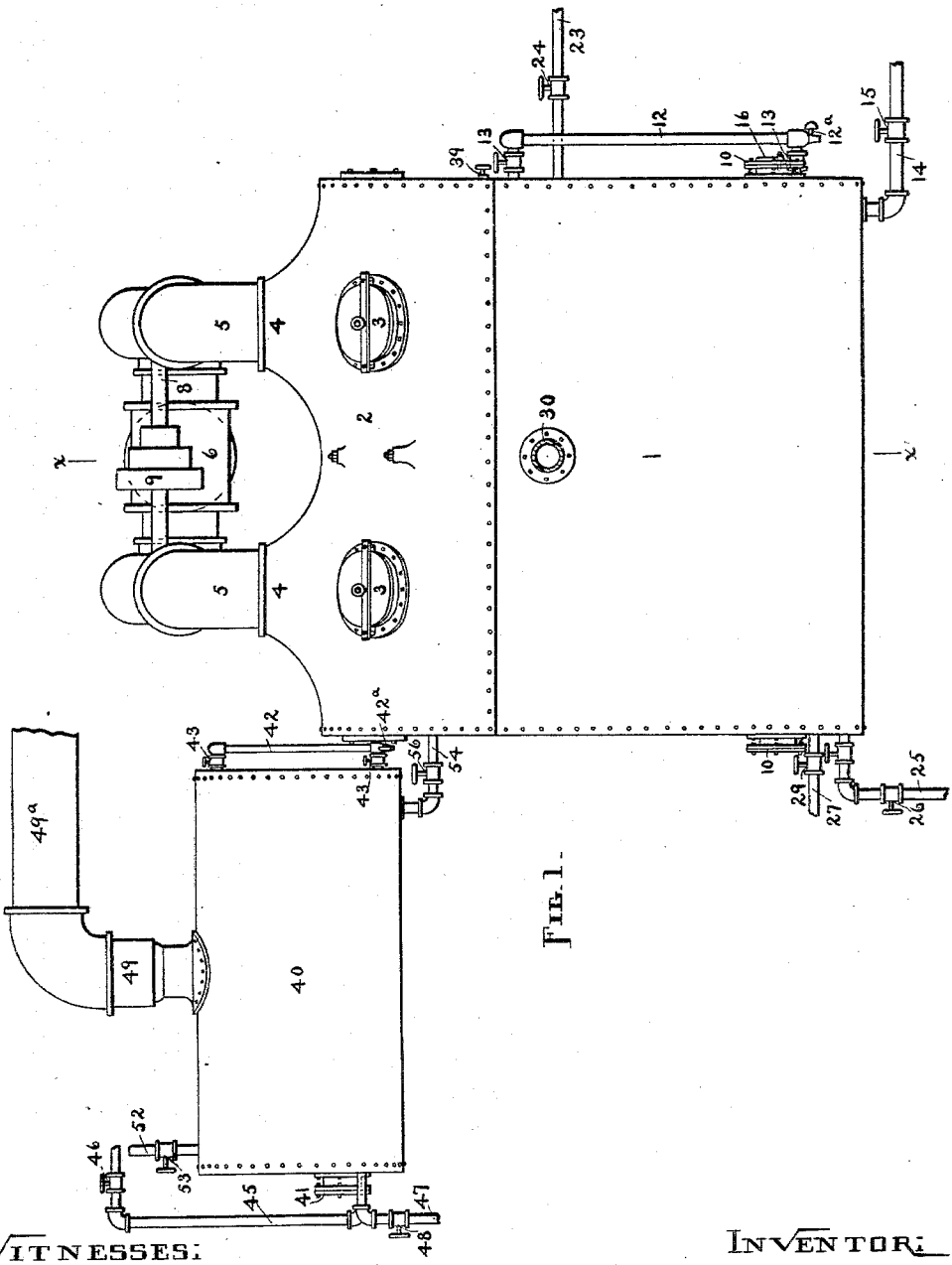

(No Model.) 4 Sheets—Sheet 1.
G. F. METZGER.
PROCESS OF AND APPARATUS FOR SEPARATING NAPHTHA FROM OIL.
No. 563,866. Patented July 14, 1896.

WITNESSES:
H. R. Bailey
E. R. Heyman

INVENTOR:
G. F. Metzger,
by Burridge & Cutter,
attys.

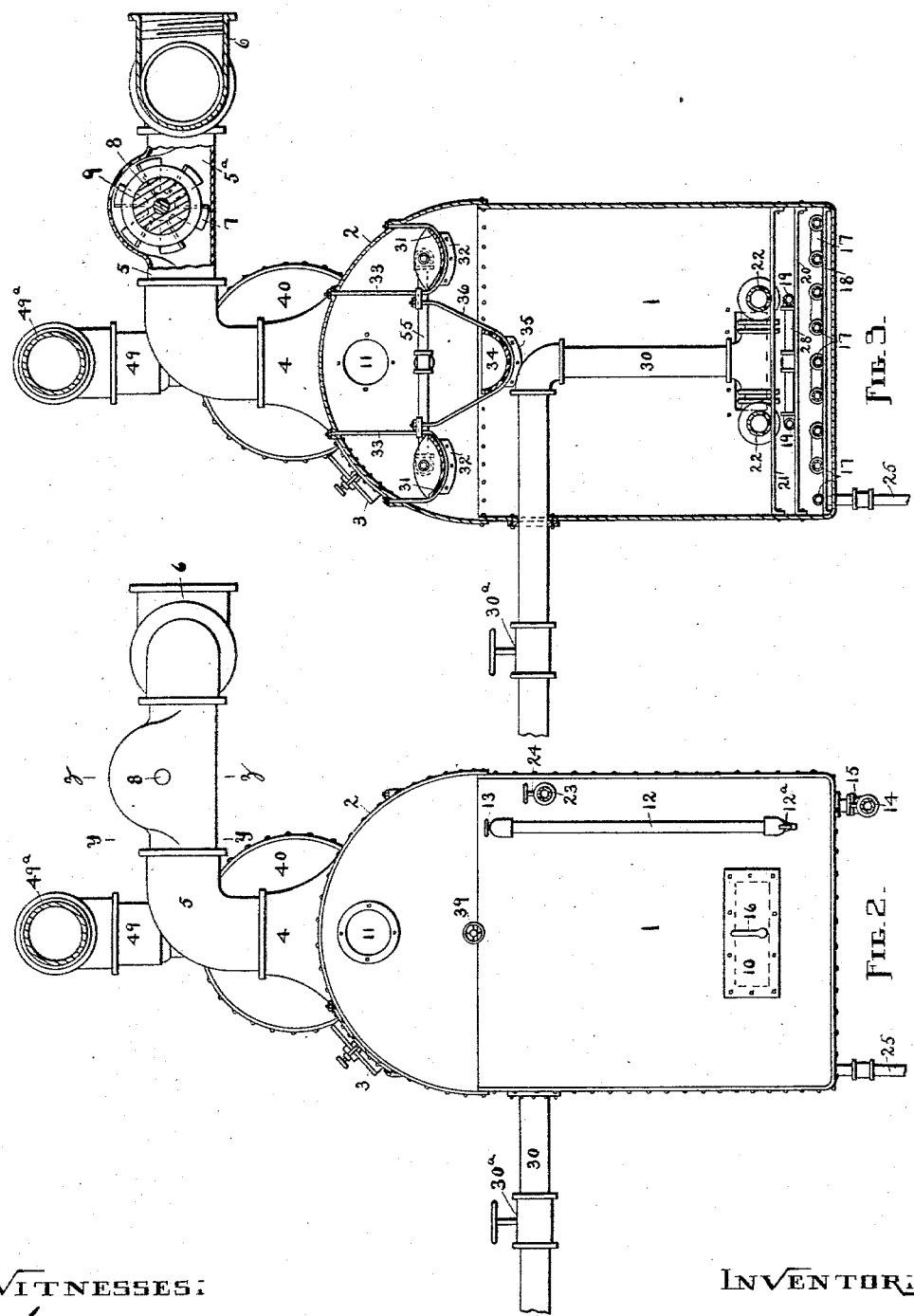

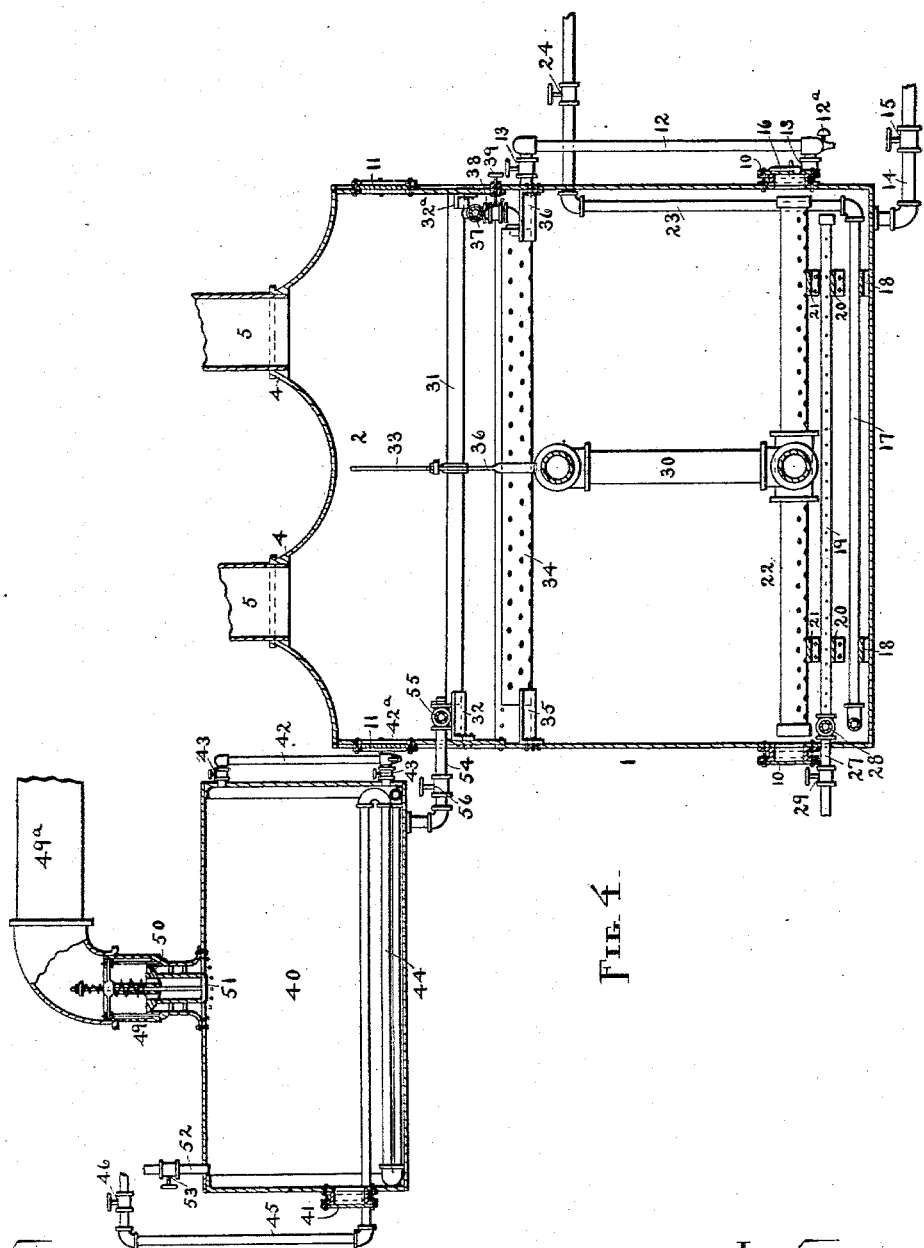

(No Model.) 4 Sheets—Sheet 4.

G. F. METZGER.

PROCESS OF AND APPARATUS FOR SEPARATING NAPHTHA FROM OIL.

No. 563,866. Patented July 14, 1896.

WITNESSES:
H. P. Bailey
E. R. Heyman

INVENTOR:
G. F. Metzger,
by Burridge & Cutter,
attys.

UNITED STATES PATENT OFFICE.

GOTTLEIB F. METZGER, OF CLEVELAND, OHIO.

PROCESS OF AND APPARATUS FOR SEPARATING NAPHTHA FROM OIL.

SPECIFICATION forming part of Letters Patent No. 563,866, dated July 14, 1896.

Application filed May 4, 1895. Serial No. 548,106. (No model.)

*To all whom it may concern:*

Be it known that I, GOTTLEIB F. METZGER, a citizen of the United States, residing at Cleveland, in the county of Cuyahoga and State of Ohio, have invented certain new and useful Improvements in Processes of and Apparatuses for Separating Naphtha from Oil, of which the following is a full, clear, and exact description.

My invention relates to a process of and an apparatus for separating naphtha or other volatile solvent from oil after the mixture of oil and naphtha have been obtained from the percolator in which said oil was extracted from crushed seed by said naphtha.

The process consists, essentially, of heating the oil and naphtha compound in one receptacle and a small body of water in another receptacle to the desired temperature by indirect heat, bringing said compound into contact with the vapor arising from said water and separating or spreading it in such a manner that said vapor and the heat have an opportunity to act upon small quantities and even drops of the mixed oil and naphtha, and blowing air into the main body of liquid, whereby the naphtha not previously driven off is removed and the remaining oil thoroughly washed and cleansed by the remaining water until all impurities are eliminated.

An additional feature of my process is a constant suction or draft for conducting away the vapor arising from the heated water and naphtha. The apparatus comprises a receiver containing non-perforated and perforated troughs in the upper part, perforated air-pipes and a steam-coil in the lower part, and fans located in the vapor-exit pipes, also a tank having an interior steam-coil, together with the necessary pipes and connections, all as hereinafter fully set forth and claimed.

The object of my improvement is to provide a process and apparatus for the purpose specified, which is conomical, rapid in operation, free from danger, and capable of producing a superior quality of oil. It is very desirable to employ hot water in place of live steam for the purpose of separating naphtha from oil, in order to have enough moisture to sufficiently saturate said naphtha for the rapid vaporization of the same, to more thoroughly cleanse said oil, and moisten it for final treatment. The use of steam for the purpose above noted not only retards the process of separation, but has the effect of setting or fixing the naphtha in the oil so thoroughly that it cannot always be removed, thereby leaving a rank taste and smell, but by substituting hot water I am able to remove the last vestige of impurity or taint.

The peculiar construction of my apparatus enables me to expose so large a surface of oil and naphtha to the action of the heat and vapor from the water as to render my process extremely rapid, while the blowing of air into the body of the liquid not only accelerates the vaporization of said naphtha, but most thoroughly commingles said oil and water. This process partially treats and bleaches the oil, thereby rendering its final treatment more rapid.

That my invention may be seen and fully understood by those skilled in the art, reference will be had to the following specification and annexed drawings, forming a part thereof, in which—

Figure 5:
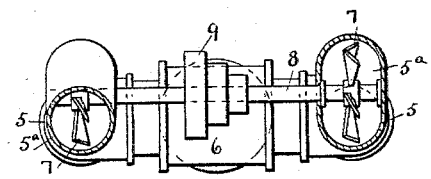
Figure 6:
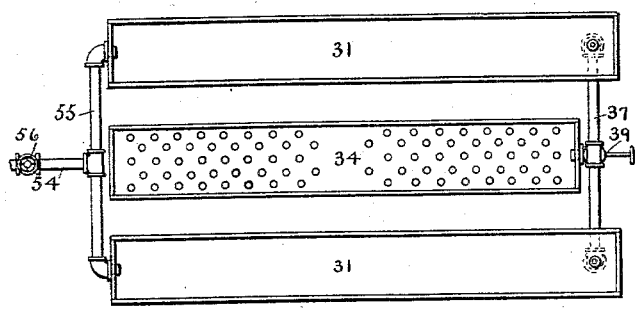
Figure 7:
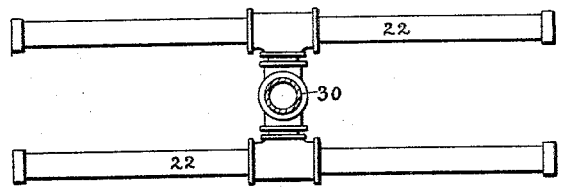

Figure 1 is a side elevation of my device; Fig. 2, a front elevation; Fig. 3, a cross-section on lines $x\,x$, Fig. 1, looking toward the rear; Fig. 4, a longitudinal section; Fig. 5, a section through the exit-pipes on lines $y\,y$ and $z\,z$, Fig. 2, showing the fans; Fig. 6, a plan view of the troughs and connections, and Fig. 7 a plan view of the air-pipes.

Similar figures of reference designate like parts in the drawings and specification.

The receiver 1 has the semicircular or oval top 2, provided with manholes closed by the covers 3, and the domes 4 4. The vapor-exit pipes 5 5 open through the domes 4 into the interior of the receiver 1, from which they pass to connect with the drum 6. The drum 6 communicates by a pipe (not shown in the drawings) with a condensing-tank, where the naphtha-vapor is finally received. Each pipe 5 has the chamber $5^a$ to receive the fan 7. The fans 7 are fast on opposite ends of the shaft 8, which is journaled in the sides of the chambers $5^a$, and motion is imparted to said shaft and fans by means of a belt (not shown) passing over the cone-pulley 9. The receiver 1 has the doors 10 10 and the sight-glasses 11

11 in opposite ends, the oil-glass 12 having the valves 13 13 and the cock $12^a$ and the oil-pipe 14 with the valve 15. The pipe 14 opens into one corner of the receiver-floor, and through it the oil is drawn from the receiver at the end of the separating process. The thermometer 16 in one of the doors 10 registers the interior temperature of the receiver 1. The glasses 11 permit of an unobstructed view of the contents of the receiver 1, and the glass 12 registers the height of liquid contained therein.

In the bottom of the receiver 1 the steam-coil 17 is raised slightly above the floor on the supports 18. Above the coil 17 are the perforated hot-water pipes 19 19, resting upon the supports 20, and the supports 21 carry the perforated air-pipes 22 22. Live steam is admitted to the coil 17 through the pipe 23, having the valve 24, and said steam passes from said coil into the waste-pipe 25, which has the valve 26. The perforated pipes 19 receive their supply of water through the pipe 27 outside and the pipe 28 inside of the receiver 1, the former of said pipes having the valve 29. The pipes 22 are perforated only in their under sides, in order that the air forced through said pipes shall be directed downward; otherwise oil as well as vapor might be driven upward and carried away through the pipes 5. The pipes 22 are centrally connected by short pipes with the pipe 30, and the ends of the former are capped. The pipe 30 extends vertically from its connection with the pipes 22 and then passes horizontally out of one side of the receiver 1, the horizontal portion of said pipe being provided with the valve $30^a$.

The shallow, imperforate troughs 31 31 are supported by the brackets 32 $32^a$ from the ends of the receiver 1 and by the central hangers 33 33 from the top 2. The shallow, perforated trough 34 is supported below the troughs 31 by the brackets 35 35 from the ends of the receiver and the hanger 36, which is a continuation of the hangers 33. The trough 34 is located midway between the sides of the receiver 1, while the troughs 31 are situated near the sides of the top 2, and the capacity of the former is equal to that of the two latter. The bottoms of the front ends of the troughs 31 are in open connection with the front end of the trough 34 through the pipes 37 and 38, the latter being provided with the valve 39, having its stem extending through the front end of the receiver 1.

The tank 40 is a little remote from the rear end of the receiver 1 and has the door 41 in its rear end and the oil-glass 42 with valves 43 43 and cock $42^a$ at the front end. The height of liquid in the tank 40 is registered by the glass 42, and, when necessary, the condition of the contents of said tank may be ascertained by opening the cock $42^a$ and drawing off a little. The cock $12^a$ answers a similar purpose in the receiver oil-glass 12.

The steam-coil 44 rests on the bottom of the tank 40 and connects at one terminal with the live-steam pipe 45, having the valve 46, and at the other terminal with the waste-pipe 47, having the valve 48. The vacuum safety-valve 49 is centrally mounted on the top of the tank 40 and provided with the valves 50 and 51, the former being perforated. Too great a pressure in the tank 40, produced by overheating its contents, overcomes the resiliency of the spring above the valve 50, and, by raising said valve, is relieved, while the opposite extreme approaching a vacuum, resulting from quickly drawing off the contents of said tank, overcomes the resiliency of the spring controlling the valve 51, and, by drawing said valve downward as it were, admits air through the perforations in the valve 50 into the tank. Thus the valve 49 obviates any liability of an explosion or collapse of the tank 40. The pipe $49^a$ is in open connection with the top of the valve 49 and serves as a conduit for outgoing vapor and incoming air. The oil and naphtha mixture is admitted to the tank 40 by the pipe 52, having the valve 53. The pipes 54 and 55 connect the bottom of the tank 40 at the front with the rear ends of the troughs 31, and the former pipe has the valve 56.

The operation of my device and the process are as follows, all valves closed except as otherwise specified: Open the valve 53 and admit the mixed oil and naphtha into the tank 40 until it is nearly full, and also open the valves 46 and 48 to admit live steam through the coil 44. While filling and heating the tank 40 open the valve 29 and admit water, preferably hot, into the perforated pipes 19 until an amount equivalent to five per cent., more or less, of the holding capacity of the receiver 1 has been run into said receiver and then shut off the water supply. Meanwhile the valves 24 and 26 have been opened to admit live steam through the coil 17 for the purpose of heating the interior of the receptacle 1 and vaporizing more or less of the water contained therein. After the contents of the tank 40 and the receiver 1 are heated to the desired temperature, open the valve 56, permitting the mixture from said tank to enter said receiver where it is first received in the upper troughs 31. The shallow construction of the troughs 31 causes the mixture to spread out, so as to subject a large surface of the same to the action of the surrounding heat and vapor, whereby a considerable portion of the naphtha is driven off. The fans 7 are set in motion as soon as the mixture is admitted to the receiver 1 and they continue to revolve and create a suction or draft during the entire process, thus serving to quickly remove the vaporized naphtha. The troughs 31 incline slightly forward and their remaining contents flow through the pipes 37 and 38 into the perforated trough 34, the valve 39 having first been opened from the outside. The trough 34 not only spreads out the mixture contained therein, thus exposing it, as in the troughs above, to the vaporizing elements, but the perforations in said trough permit the liquid to slowly trickle through and fall to the water below, thereby rendering the elemental action still more potent and rapid because of the separated condition of said liquid. A small percentage of naphtha still remains in the oil after it strikes the main body of liquid in the bottom of the receiver 1, and in order to drive off the last vestige of impurity and thoroughly wash and cleanse the oil, hot air is forced into and through the perforated pipes 22 when about fifty per cent. of the mixture has been admitted to the receiver 1. The hot air is now used continually until the oil is ready to be drawn off. The air forced through the pipes 22 may be cold, but better results are obtained by using it hot. The liquid is thoroughly agitated and commingled by the air which forces the water into and through practically every drop of oil, not alone rendering said oil sufficiently moist for final treatment, but actually treating and bleaching the same in part at this stage of the manufacture.

The results obtained by employing water and air in the manner hereinbefore stated cannot be obtained with live steam injected directly into the oil and naphtha compound or into the oil after the naphtha has been driven off. During the last half of the treatment evaporation of naphtha takes place both at the top and bottom of the receiver 1, as will be readily understood from the foregoing description. When all naphtha and impurities have been eliminated from the oil, stop the fans 7, shut off the hot-air supply and the steam, and remove the oil from the receiver 1 through the pipe 14.

A greater or less draft in the exit-pipes 5 is obtained, of course, by regulating the speed of the fans 7. The shape of the top 2 and the domes 4 is conducive to the easy and rapid removal of the vapor through the pipes 5 before condensation takes place. If more water is needed in the receiver 1 during operation, it may be admitted as before through the pipes 27, 28, and 19. During the process the mixed oil and naphtha are run into the tank 40 through the pipe 52 as fast as the same passes into the receiver 1 from said tank, and the troughs 31 and 34 are kept full by regulating the flow of liquid through the medium of the valves 56 and 39.

A sufficient amount of moisture is always present in the receiver 1 to render the separation of the naphtha from the oil free from danger.

My process and apparatus are applicable for the treatment of animal as well as seed oil, provided a volatile solvent is employed in the extraction thereof.

I do not wish to confine myself to the exact number of pipes and troughs shown and described, since said number may vary in apparatuses which differ in capacity. Water may be introduced into the receiver 1 through an ordinary pipe, thus dispensing with the perforated pipes 19, or in any other suitable manner; but said pipes are preferred because of their utility when necessary to replenish the water during the active stages of the process.

What I claim as my invention, and desire to secure by Letters Patent, is—

1. The process herein described of eliminating a volatile solvent from oil, which consists in independently heating the mixture and a separate body of water to the desired temperature by indirect radiation, in introducing said compound in an extended and separated condition into the presence of the vapor arising from said water and subjecting the same to the surrounding heat, and in rapidly exhausting the resulting solvent vapor, substantially as and for the purpose set forth.

2. The process herein described of eliminating a volatile solvent from oil, which consists in independently heating the mixture and a separate body of water to the desired temperature by indirect radiation, in introducing said compound in an extended and separated condition into the presence of the vapor arising from said water, subjecting the same to the surrounding heat and commingling it with said water, in introducing air directly into the compound and water, and in rapidly exhausting the resulting solvent vapor, substantially as and for the purpose set forth.

3. The process herein described of treating oil intermixed with a volatile solvent, which consists in independently heating the mixture and a body of water by indirect application of heat to a temperature high enough to throw off vapor from said water and compound, agitating and commingling said water and oil by direct application of air to further vaporize said solvent, wash and moisten said oil, and exhausting the resulting solvent vapor before condensation, substantially as and for the purpose set forth.

4. The combination in an apparatus for separating naphtha from oil, of a receiver, one or more inclined shallow imperforate troughs supported in the upper part of said receiver by brackets and hangers, and one or more perforated troughs of the same holding capacity as said imperforate troughs supported below the latter by brackets and a hanger or hangers, said imperforate and perforated troughs being in open connection with each other through pipes, substantially as and for the purpose set forth.

5. The combination in an apparatus for separating naphtha from oil, of a receiver, one or more inclined shallow imperforate troughs supported in the upper part of said receiver by brackets and hangers, one or more perforated troughs of the same holding capacity as said imperforate troughs supported below the latter by brackets and a hanger or hangers, pipes connecting said imperforate and perforated troughs inside of said receiver, and a valve in one of said pipes operated from the outside, substantially as and for the purpose set forth.

6. The combination in an apparatus for separating naphtha from oil, of a receiver having an oval top surmounted by one or more domes, chambered vapor-exit pipes leading from said domes, the rotary fans 7 in the exit-pipe chambers, one or more inclined shallow imperforate troughs supported in the upper part of said receiver by brackets and hangers, and one or more perforated troughs of the same holding capacity as said imperforate troughs supported below the latter by brackets and a hanger or hangers, said imperforate and perforated troughs being in open connection with each other through pipes, substantially as and for the purpose set forth.

7. The combination in an apparatus for separating naphtha from oil, of a receiver, one or more inclined shallow imperforate troughs supported in the upper part of said receiver by brackets and hangers, one or more perforated troughs of the same holding capacity as said imperforate troughs supported below the latter by brackets and a hanger or hangers, said imperforate and perforated troughs being in open connection with each other through pipes, and a steam-coil on the bottom of said receiver, substantially as and for the purpose set forth.

8. The combination in an apparatus for separating naphtha from oil, of a receiver, one or more inclined shallow imperforate troughs supported in the upper part of said receiver by brackets and hangers, one or more perforated troughs of the same holding capacity as said imperforate troughs supported below the latter by brackets and a hanger or hangers, said imperforate and perforated troughs being in open connection with each other through pipes, a steam-coil and the air-pipes 22 in the lower part of said receiver, the latter perforated in their under sides, and the air conduit or pipe 30 connected to said pipes 22, substantially as and for the purpose set forth.

9. The combination in an apparatus for separating naphtha from oil, of a receiver having an oval top surmounted by one or more domes, chambered vapor-exit pipes leading from said domes, the rotary fans 7 in the exit-pipe chambers, one or more inclined shallow imperforate troughs supported in the upper part of said receiver by brackets and hangers, one or more perforated troughs of the same holding capacity as said imperforate troughs supported below the latter by brackets and a hanger or hangers, said imperforate and perforated troughs being in open connection with each other through pipes, a steam-coil and the air-pipes 22 in the lower part of said receiver, the latter perforated in their under sides, and the air conduit or pipe 30 connected to said pipes 22, substantially as and for the purpose set forth.

10. In an apparatus for separating naphtha from oil, a receiver provided with one or more imperforate troughs, and a steam-coil, in combination with a tank having a steam-coil therein, connected by pipes with said troughs, substantially as and for the purpose set forth.

11. The combination in an apparatus for separating naphtha from oil, of a receiver having an oval top surmounted by one or more domes, vapor-exit pipes leading from said domes, said pipes having chambers therein, rotary fans in said chambers, one or more imperforate troughs and a steam-coil in said receiver, and a tank having a steam-coil therein, connected by pipes with said troughs, substantially as and for the purpose set forth.

12. In an apparatus for separating naphtha from oil, a receiver provided with one or more upper imperforate troughs, one or more lower perforated troughs connected to said imperforate troughs by pipes, and a steam-coil, in combination with a tank having a steam-coil therein, connected by pipes with said imperforate troughs, substantially as and for the purpose set forth.

13. The combination in an apparatus for separating naphtha from oil, of a receiver having an oval top surmounted by one or more domes, vapor-exit pipes leading from said domes, said pipes having chambers therein, rotary fans in said chambers, one or more upper imperforate troughs and one or more lower perforated troughs connected to said imperforate troughs by pipes, and a steam-coil in said receiver, and a tank having a steam-coil therein, connected by pipes with said imperforate troughs, substantially as and for the purpose set forth.

14. In an apparatus for separating naphtha from oil, a receiver provided with one or more imperforate troughs, a steam-coil, and a perforated air-pipe, in combination with a tank having a steam-coil therein, connected by pipes with said troughs, substantially as and for the purpose set forth.

15. In an apparatus for separating naphtha from oil, a receiver provided with one or more upper imperforate troughs, one or more lower perforated troughs connected by pipes with said imperforate troughs, a steam-coil, and a perforated air pipe or pipes, in combination with a tank having a steam-coil therein, connected by pipes with said imperforate troughs, substantially as and for the purpose set forth.

16. The combination in an apparatus for separating naphtha from oil, of a receiver having an oval top surmounted by one or more domes, vapor-exit pipes leading from said domes, said pipes having chambers therein, rotary fans in said chambers, one or more imperforate troughs, a steam-coil and a perforated air pipe or pipes in said receiver, and a tank having a steam-coil therein, connected by pipes with said troughs, substantially as and for the purpose set forth.

17. The combination in an apparatus for separating naphtha from oil, of a receiver having an oval top surmounted by one or more domes, vapor-exit pipes leading from said domes, said pipes having chambers therein, rotary fans in said chambers, one or more upper imperforate troughs, one or more lower perforated troughs connected to said imperforate troughs by pipes, a steam-coil, and a perforated air pipe or pipes in said receiver, and a tank having a steam-coil therein, connected by pipes with said imperforate troughs, substantially as and for the purpose set forth.

In testimony whereof I affix my signature in presence of two witnesses.

GOTTLEIB F. METZGER.

Witnesses:
F. A. CUTTER,
H. P. BAILEY.